(12) United States Patent
Warner et al.

(10) Patent No.: X9762
(45) Date of Patent: Jun. 22, 1836

(54) HARNESS, HORSE COLLARS, FORMING

(76) Inventors: Gilbert Warner; Robert Robinson

Gilbert Warner & Robert Robison Canajoharie N.Y.

Letters Patent

The Schedule referred to in these Letters Patent and making part of the same containing a description in the words of the said Gilbert Warner & Robert Robison of their improvement in a Machine for forming and Stretching Horse Collars To all to whom these presents shall come Be it known that Gilbert Warner & Robert Robison of Canajoharie in the County of Montgomery State of New York have invented a new and useful improvement in a machine used for forming and stretching Collars used around the neck of Horses and other beasts for drawing. And that the following is a full and exact description of the construction and operation of the said Machine as invented or improved by us.

The bottom or lower part of this Machine is made out of plank and is two inches thick and fourteen inches wide and twenty six inches long which bottom rests upon four legs fastened into the bottom upon which bottom is placed and fastened a combination of several pieces of timber which all together form the shape of the inside of a collar when finished and upon which the Collar is to be formed and stretched as hereinafter mentioned.

This combination of timbers consists of four pieces and are as follows. First the piece that forms the lower part of the Collar is about nine inches one way and four the other and about five inches thick being rounded on one of the sides forming the nine inches in a circular form to form and stretch the lower part of a Collar which said piece of timber is fastened down with two or more screws with nutts underneath to the bottom as aforesaid. The second piece of the combination of timbers is fourteen inches long five inches thick and eight inches wide at the widest end.

That is then narrowed down to the shape of a wedge two inches towards the other end at which place it is only five inches wide to a shoulder or projection formed by the narrower end of the said piece of timber and which said narrow end is to be formed and carved out to form and stretch the upper end part of the sides of a Collar. And said piece of timber is kept to its place upon the bottom of the machine excepting moving backwards
& forwards by a small piece of timber fastened at the lower part and at the narrow-
er end to form the upper part of the collar which said small piece of timber is let
through the bottom of the machine and moving backwards and forwards as hereinaf-
ter mentioned. The wide end of said piece of timber is to form in and meet the square
end of and middle side of the first piece of timber described.

The two remaining pieces of timber are formed
alike in every particular and when in use operate in the same way; they are
each twelve inches long and three and half inches thick at the lower and five
inches high when placed on the bottom of the machine in their proper places and
tapering nearly from the center each way and are also carved out so to form and make
the part of a collar between the upper and lower part of it and are placed upon the
sides and against the shoulders or projection of the second piece of timber describ[illegible]
and extending two inches along the ends of the first piece of timber described which said
four pieces of timber as described and placed and fastened upon the bottom piece
of the machine as aforesaid form the shape of the inside of a collar when fin-
ished. And said combination of timbers when placed and fastened upon the
bottom of the machine as aforesaid are sixteen long on the top and ten and
a half wide at the top but may be enlarged by the turning of a screw as here
after mentioned to a collar of the size of twenty four inches long and thir-
teen inches wide. That part of the combination of timbers which forms and
stretches a collar or where the collar touches is to be covered with a canvas.

The screw alluded to before is made out of
iron with a crank to it of the same which said screw is placed through the first
piece of timber described forming the lower part of the collar in which is placed
a nut made out of iron to receive the screw and enters that circular part of the
said piece of timber and extends to & in the wide end of the second piece of tim-
ber described in which there is a plate on which the screw turns The advantages of the improvement in
the machine are these that by placing the unformed and unstretched collar
upon the machine as aforesaid and turning the crank attached to the
screw it will effect several desirable objects by one motion and at the same
time first it will stretch the collar in length and second in width and lastly it will give the Collar its proper form to sett easy on the neck & head of a beast. The manner in which this is done is that by turning the screw it forces forward the second piece of timber described in the top and upper part of the collar where the first piece of timber described remains immovable and by the turning of the screw means ahead the second piece of timber described it at the same time throws out each way the two side pieces of timber described which stretches the collar in width and in the same proportion as it stretches it in length.

[illegible] at the same time gives all the parts of the collar the proper shape. The two side pieces as described are thrown out by the going ahead the second piece described which it will be remembered narrowing to the shape of a wedge and the side pieces are so placed upon the bottom part of the machine that they can move but one way which is the shape of the collar and are sliding in their proper place by means of dowells which are let in a [illegible] in the bottom piece. In the room of a screw to produce this effect a wedge may be used by placing and driving it between the first and second pieces of timber described which will move the second piece ahead and through the two side pieces out as aforesaid

What we Claim as new and improved by us is the Construction shape form and Combination of the four pieces of timber as described and effect produced in forming and stretching of the collar in length & width at the same time and with one and the same motion

Witnesses
Joseph [illegible]
[illegible] Van [illegible]

[illegible] [illegible]
[illegible] [illegible]

Exd
[illegible]

1245 [illegible]